United States Patent
Cahoy et al.

(10) Patent No.: US 11,296,787 B2
(45) Date of Patent: Apr. 5, 2022

(54) INTEGRATED TRACK-AND-RECEIVE SYSTEM FOR FREE-SPACE OPTICAL COMMUNICATIONS

(71) Applicant: Massachusetts Institute of Technology, Cambridge, MA (US)

(72) Inventors: Kerri Cahoy, Lexington, MA (US); Paul Serra, Boston, MA (US); Ondrej Cierny, Cambridge, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 0 days.

(21) Appl. No.: 17/187,726

(22) Filed: Feb. 26, 2021

(65) Prior Publication Data
US 2021/0336697 A1  Oct. 28, 2021

Related U.S. Application Data

(60) Provisional application No. 63/016,623, filed on Apr. 28, 2020.

(51) Int. Cl.
*H04B 10/112* (2013.01)
*G02B 6/036* (2006.01)
(Continued)

(52) U.S. Cl.
CPC ....... *H04B 10/1127* (2013.01); *G02B 6/0288* (2013.01); *G02B 6/03622* (2013.01);
(Continued)

(58) Field of Classification Search
None
See application file for complete search history.

(56) References Cited

U.S. PATENT DOCUMENTS

| | | | | |
|---|---|---|---|---|
| 4,227,077 A | * | 10/1980 | Hopson | F41G 7/2213 244/3.16 |
| 7,860,344 B1 | * | 12/2010 | Fitzpatrick | G06K 9/3241 382/291 |

(Continued)

OTHER PUBLICATIONS

Cierny et al., "Testing of the CubeSat Laser Infrared CrosslinK (CLICK-A) Payload," in 34th AIAA/USU Conference on Small Satellites, (Aug. 2020). 23 pages.
(Continued)

*Primary Examiner* — Darren E Wolf
(74) *Attorney, Agent, or Firm* — Smith Baluch LLP (57) ABSTRACT

A monostatic, beaconless fiber transceiver for free-space optical links infers fine tracking information using receiver optoelectronics and an injected pointing dither (nutation). A MEMS steering mirror fine-points the beams and injects the nutation. While this may disturb fiber coupling and transmit beam pointing, link loss becomes negligible for sufficient SNR. The SNR for links without point-ahead correction is about 35 dB to keep dither loss below 0.1 dB and RMS spatial tracking noise below a tenth of the beam divergence. Since the pointing and tracking bandwidth is much smaller than the receiver communication bandwidth, this SNR is achievable with appropriate filtering. For point-ahead correction, a single-mode fiber transceiver can reach up to about 1 beamwidth of correction, while a few-mode fiber transceiver can reach up to about 1.75 beamwidths due to improved coupling sensitivity at higher point-ahead offsets. Using a double-clad fiber with a secondary detector further reduces the incurred coupling loss.

19 Claims, 7 Drawing Sheets

(51) Int. Cl.
*G02B 6/028* (2006.01)
*H04B 10/40* (2013.01)
*H04B 10/50* (2013.01)
*H04B 10/60* (2013.01)
*H04B 10/25* (2013.01)

(52) U.S. Cl.
CPC ......... *H04B 10/1129* (2013.01); *H04B 10/25* (2013.01); *H04B 10/40* (2013.01); *H04B 10/50* (2013.01); *H04B 10/60* (2013.01)

(56) References Cited

U.S. PATENT DOCUMENTS

| | | | |
|---|---|---|---|
| 8,730,456 B2 | 5/2014 | Goldberg et al. | |
| 10,892,824 B2 | 1/2021 | Geisler et al. | |
| 2002/0109886 A1* | 8/2002 | Barbier | G02B 6/4246 398/121 |
| 2009/0324236 A1* | 12/2009 | Wu | H04B 10/118 398/122 |
| 2014/0021329 A1* | 1/2014 | Spickermann | G02B 26/0816 250/201.1 |
| 2020/0343973 A1 | 10/2020 | Geisler et al. | |

OTHER PUBLICATIONS

Culshaw et al., "Propagation of the Fundamental Mode in Curved Graded Index Multimode Fiber and Its Application in Sensor Systems," Journal of Lightwave Technology 18, 334 (Mar. 2000). 9 pages.

DeVoe et al., "Optical overview and qualification of the LLCD space terminal," Proc. SPIE 10563, International Conference on Space Optics—ICSO 2014, 105630F (Nov. 17, 2017); https://doi.org/10.1117/12.2304194, 9 pages.

Ferraro et al., "Position Sensing and High Bandwidth Data Communication Using Impact Ionization Engineered APD Arrays," IEEE Photonics Technology Letters 31, 58-61 (Jan. 2019). 4 pages.

Giggenbach et al., "Prototype of a coherent tracking and detection receiver with wideband vibration compensation for free-space laser communications," in Proceedings of SPIE—Free-Space Laser Communication Technologies VIII, Mecherle, G. S., ed., 2699, 186, International Society for Optics and Photonics (Apr. 1996). 7 pages.

Hemmati, Near-earth laser communications. CRC press, 2020. 419 pages.

Johann et al., "Novel optical-fiber-based conical scan tracking device," in Optical Space Communication II, Franz, J., ed., 1522, 243, SPIE (May 1991). 10 pages.

Knibbe et al., "Spatial tracking using an electro-optic nutator and a single-mode optical fiber," Proc. SPIE 1635, Free-Space Laser Communication Technologies IV, (Jun. 9, 1992); https://doi.org/10.1117/12.59284, 10 pages.

Lao et al., "Large field of view beaconless laser nutation tracking sensor based on a micro-electro-mechanical system mirror," Applied Optics 59, 6534 (Aug. 2020). 6 pages.

Madore et al., "Asymmetric double-clad fiber couplers for endoscopy," Optics Letters 38, 4514 (Nov. 2013). 4 pages.

Milanović et al., "Iterative learning control algorithm for greatly increased bandwidth and linearity of MEMS mirrors in LiDAR and related imaging applications," Proc. SPIE 10545, MOEMS and Miniaturized Systems XVII, 1054513 (Feb. 22, 2018); https://doi.org/10.1117/12.2291428, 15 pages.

Rodiger et al., "High data-rate optical communication payload for CubeSats," in Laser Communication and Propagation through the Atmosphere and Oceans IX, Wayne, D. T., Anguita, J. A., and Bos, J. P., eds., 11506, 3, SPIE (Aug. 2020). 14 pages.

Sinclair et al., "The Rainbow Connection—Why Now is the Time for Smallsat Optical Downlinks," in 31st Annual AIAA/USU Conference on Small Satellites, (Aug. 2017). 6 pages.

Tedder et al., "Exploration of double clad fibers for increased stability of bidirectional free space optical links." Free-Space Laser Communication and Atmospheric Propagation XXX. vol. 10524. International Society for Optics and Photonics, 2018. 9 pages.

Zhao et al., "Experimental verification of coherent tracking system based on fiber nutation," Optics Express 27, 23996 (Aug. 2019). 11 pages.

* cited by examiner

INTEGRATED TRACK-AND-RECEIVE SYSTEM FOR FREE-SPACE OPTICAL COMMUNICATIONS

CROSS-REFERENCE TO RELATED APPLICATION(S)

This application claims the priority benefit, under 35 U.S.C. 119(e), of U.S. Application No. 63/016,623, filed Apr. 28, 2020, which is incorporated by reference herein in its entirety.

BACKGROUND

Free-space optical (FSO) links enable multi-gigabit-per-second wireless communications across large distances, which makes them attractive for space and aeronautical applications as well as terrestrial backhaul links. However, stringent beam pointing requirements make the implementation of these FSO links challenging. Especially long-distance links (e.g., several kilometer, terrestrial, ground-to-space, or space-to-space links) with very narrow laser beams require pointing accuracy on the order of microradians (µrad) to establish and maintain the link. Consequently, FSO communications terminals normally have additional hardware for tracking and beam steering.

A typical FSO communications terminal (also called the local terminal or receiver) performs real-time pointing, acquisition, and tracking of a remote terminal (transmitter) with a sensor and an active component, such as a gimbal, fast-steering mirror (FSM), or adaptive optics. The local terminal uses the sensor and circuitry to lock onto a beacon laser signal sent by the remote terminal or onto the optical communications signal itself if the local terminal is also a receiver. Tracking normally uses an independent optical chain with a specialized tracking sensor (e.g., a camera). The active component steers the beam emitted by the local terminal toward the remote terminal based on the received beacon signal or the amplitude of the detected optical communications signal. In any event, the additional tracking hardware (optics, sensors, electronics, beacon laser) increase the complexity, cost, size, weight and power (SWaP) of the FSO communications terminal.

There are several different ways to implement pointing, acquisition, and tracking in an FSO communications terminal. For example, a spatial acquisition and tracking channel based on a beacon laser and auxiliary tracking sensors can augment the pointing system to enable closed-loop pointing with high accuracy. These supplementary systems make FSO terminals more complex and demanding in terms of size, weight, power consumption, and cost (SWaP-C). Recently, low SWaP-C micro-electro-mechanical systems (MEMS) FSMs have been used to help with the miniaturization of FSO terminals.

A conventional bidirectional (full-duplex) FSO terminal has a high-bandwidth optical receiver chain apart from the usually much slower spatial tracking chain. Typically, these two chains use independent hardware, with different detectors, optics, and support electronics. To reduce the system complexity and SWaP-C, it can be helpful to eliminate some of this hardware and form an integrated beaconless track-and-receive chain. Coherent fiber-less optical receivers based on balanced photodetectors can infer both data and position information from the same chain. Other fiber-less receivers based on direct detection use custom-engineered, hybrid avalanche photodiode (APD) arrays to receive high-bandwidth data and sense position simultaneously.

Figure 1:
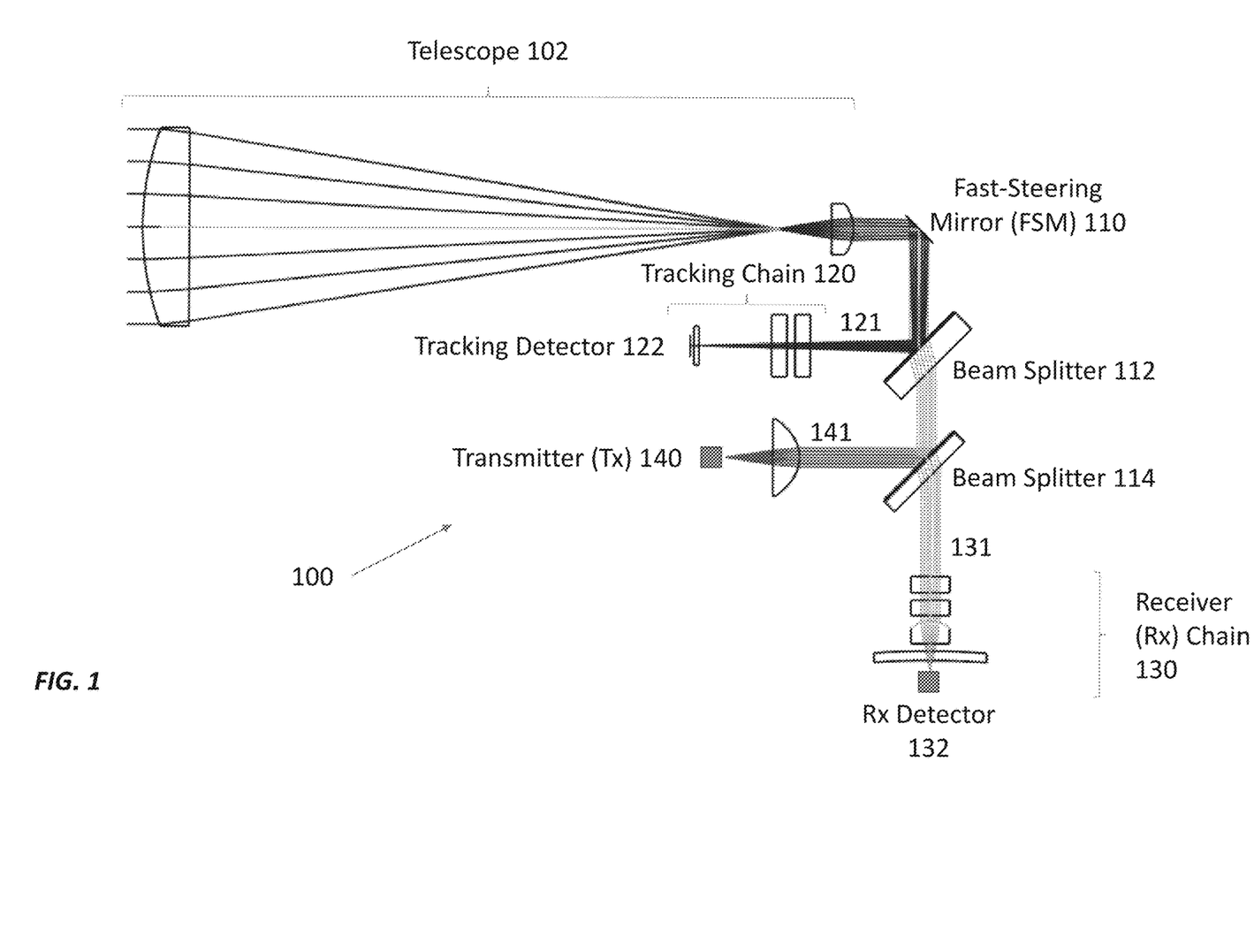
FIG. 1 shows a fiber-less, full-duplex transceiver with separate receive and tracking chains.

FIG. 1 shows a fiber-less, full-duplex FSO terminal 100, also called a transceiver because it can transmit and receive signals. It offers easier coupling than fiber-based transceivers at the expense of extra routing optics, extra sensors, and no possibility of using a fiber amplifier to amplify the received signals. This transceiver 100 is a free-space transceiver with a telescope 102 that simultaneously receives a beacon signal 121 and a receive (RX) communications signal 131 from a remote terminal (not shown) and transmits a transmit (TX) communications signal 141 to the remote terminal. The beacon signal 121, RX communications signal 131, and TX communications signal 141 are at different wavelengths so they can be separated and combined using wavelength-selective components.

The telescope 102 directs the beacon signal 121 and RX communications signal 131 onto an FSM 110, which reflects the beacon signal 121 and RX communications signal 131 onto a first dichroic beam splitter 112. The first dichroic beam splitter 112 directs the beacon signal 121 to a tracking chain 120, which includes optics and a tracking detector 122 that senses the amplitude of the beacon signal 121. Tracking electronics (not shown) coupled to the tracking detector 122 and FSM 110 drive the FSM 110 to increase or maximize the amplitude of the beacon signal 121 sensed by the tracking detector 122. The first dichroic beam splitter 112 directs the RX communications signal 131 to a second dichroic beam splitter 114, which transmits the RX communications signal 131 to an RX chain 130 with optics and a detector 132 for detecting the RX communications signal 131. The second dichroic beam splitter 114 also reflects the TX communications signal 141 from a transmitter 140 through the first dichroic beam splitter 112, off the FSM 110, and through the telescope 102 to the remote terminal.

Fiber-coupled receivers and transceiver can use commercially available telecommunications components, including erbium-doped fiber amplifiers, for higher performance at the expense of difficult and potentially lossy free-space-to-fiber coupling. For better coupling, fiber-coupled receivers (both coherent and direct detection) can use fiber nutation, which is based on extremum-seeking control, has been used for beaconless tracking both in laboratory and on orbit. Fiber nutation is particularly efficient, has been demonstrated both terrestrially and in space, and uses little extra hardware. Nutation tracking is applicable whenever the terminal is a receiver, either half- or full-duplex. It has the advantage that it does not require special signal routing—the optical detector that is used to decode the received communication signal can be used to infer tracking information as well.

Nutation tracking is built around a technique called extremum-seeking control, where the pointing system injects an artificial dither control signal. This dither control signal, or nutation signal, is used to evaluate where to steer the received signal to increase or maximize the received power. By analyzing the changes in power due to the injected dither, the tracking error can be inferred without specialized sensors, such as cameras on a separate optical path.

To date, nutation tracking has been performed by either moving the tip of a single-mode fiber (SMF) (where the received light is coupled from free-space into a photonic chain for processing) or by scanning the focused light on the tip of the SMF using a beam steering device, such as an FSM. In practice, this results in circular motion of the laser spot around the edge of the SMF core.

Unfortunately, nutation tracking with SMFs comes with two problems. First, coupling into SMFs is lossy. Even without nutation, efficient coupling of power into the extremely small SMF cores (few microns) is very challenging. In realistic conditions (with atmospheric beam distortions, pointing disturbances, etc.), half of the power can easily be lost unless adaptive optics are used to compensate the distortion effects (very expensive). With nutation on top, the fraction of coupled power is even lower. Second, the nutation hardware increases SWaP-C. To make extremum-seeking control feasible, the nutation should be faster than all the disturbance dynamics, otherwise the tracking information would be distorted. In practice, this means that nutation is normally performed in the kilohertz (kHz) range, which requires specialized hardware is larger, heavier, consumes more power, and costs more.

SUMMARY

Here, we disclose a fiber-coupled transceiver with a common transmit and receive optical path and with integrated beaconless tracking based on MEMS FSM nutation. The MEMS FSM is used to simultaneously reject pointing disturbances and inject a small pointing dither. The receiver detection chain performs both data reception and inference of spatial tracking information. Because the receiver and detection are integrated in a single chain, this transceiver has much lower SWaP-C than other fiber-coupled transceivers.

Even though this monostatic transceiver has lower SWaP-C, the pointing dither from the MEMS FSM may reduce the fiber-coupled receive power and disturb the transmit beam pointing. Fortunately, we can model the system's tracking performance as a function of the nutation depth (dither magnitude), the fiber coupling characteristics, and the receiver signal-to-noise ratio (SNR). This allows us to predict the SNR for achieving a given tracking performance with an acceptable nutation depth.

Our fiber-coupled transceiver can also maintain point-ahead corrections, which are used in many link configurations. Since fiber coupling is normally very sensitive to misalignment, maintaining a larger offset between the transmit and receive optical fields can rapidly degrade the link quality. Our transceiver can use one of several different fiber coupling approaches to increase the maximum point-ahead offset that can be maintained without having a large impact on the link. In particular, coupling to a few-mode graded index (GRIN) fiber can extend the point-ahead range. And coupling to a double-clad fiber with an additional detector can reduce the incurred fiber coupling losses.

An inventive free-space optical communications system may include a telescope, a dual-clad (optical) fiber, and a fast-steering mirror. In operation, the telescope receives a free-space optical communications signal from a remote terminal. The dual-clad optical fiber, which is in optical communication with the telescope, receives the free-space optical communications signal. And the fast-steering mirror, which is in optical communication with the telescope and the dual-clad optical fiber, steers the free-space optical communications signal in a nutation pattern across an end face of the dual-clad optical fiber. This couples a first portion of the free-space optical communications signal into a core of the dual-clad optical fiber and a second portion of the free-space optical communications signal into an inner cladding of the dual-clad optical fiber.

The system may also include a signal generator, operably coupled to the fast-steering mirror, to drive the fast-steering mirror at a nutation frequency greater than a first resonance frequency of the fast-steering mirror. This nutation frequency is less than a second resonance frequency of the fast-steering mirror, e.g., from 1 kHz to 20 kHz (1 kHz, 2 kHz, 3 kHz, 4 kHz, 5 kHz, 10 kHz, 15 kHz, 20 kHz, or any range among or between these values).

The system can have a coupler that is optically coupled to an output of the dual-clad optical fiber. This coupler couples the first portion of the free-space optical communications signal from the core of the dual-clad optical fiber to a first detector and couples the second portion of the free-space optical communications signal from the inner cladding of the dual-clad optical fiber to a second detector. In some cases, the system may also include circuitry, operably coupled to the first and second detectors, that produces signals proportional to the sum of and difference between the first portion and the second portion.

If the system is a duplex system, then it can also include a transmitter in optical communication with the dual-clad optical fiber (e.g., via a circulator). The transmitter transmits a second free-space optical communications signal to the remote terminal via the core of the dual-clad optical fiber, the fast-steering mirror, and the telescope. In this case, the fast-steering mirror points the second free-space optical communications signal toward the remote terminal, albeit dithered with the nutation signal.

Another inventive free-space optical communications system includes a telescope, optical fiber, fast-steering mirror, and photodetector. The telescope receives a free-space optical communications signal from a remote terminal. The optical fiber is in optical communication with the telescope and receives the free-space optical communications signal. The fast-steering mirror is in optical communication with the telescope and a first end of the optical fiber. In operation, it steers the free-space optical communications signal in a nutation pattern across an end face of the optical fiber at a nutation frequency greater than about 1 kHz and less than about 20 kHz. And the photodetector, which is in optical communication with a second end of the optical fiber, detects light modulated at the nutation frequency.

The optical fiber may have a graded-index (GRIN) core that supports a plurality of optical modes. It can also be a dual-clad optical fiber having a core surrounded by an inner cladding, in which case there may be two photodetectors: a first photodetector, in optical communication with the core, to detect a first portion of the free-space optical communications signal; and a second photodetector, in optical communication with the inner cladding, to detect a second portion of the free-space optical communications signal. If there are two photodetectors, those photodetectors can be operably coupled to circuitry that produces signals proportional to the sum and difference of the first and second portions. The circuitry can adjust a nutation pattern of the free-space optical communications signal across the end face of the first end of the optical fiber in response to the difference signal or simply in response to detecting light modulated at the nutation frequency at a second end of the optical fiber.

All combinations of the foregoing concepts and additional concepts discussed in greater detail below (provided such concepts are not mutually inconsistent) are part of the inventive subject matter disclosed herein. In particular, all combinations of claimed subject matter appearing at the end of this disclosure are part of the inventive subject matter disclosed herein. The terminology used herein that also may appear in any disclosure incorporated by reference should be accorded a meaning most consistent with the particular concepts disclosed herein.

BRIEF DESCRIPTIONS OF THE DRAWINGS

The skilled artisan will understand that the drawings primarily are for illustrative purposes and are not intended to limit the scope of the inventive subject matter described herein. The drawings are not necessarily to scale; in some instances, various aspects of the inventive subject matter disclosed herein may be shown exaggerated or enlarged in the drawings to facilitate an understanding of different features. In the drawings, like reference characters generally refer to like features (e.g., functionally similar and/or structurally similar elements).

DETAILED DESCRIPTION

A fiber-coupled laser transceiver can perform beaconless pointing and tracking based on MEMS mirror nutation. When used with single-mode fiber, the transceiver can perform nutation-based spatial tracking without a point-ahead offset and with negligible impact on the link budget if the signal-to-noise ratio (SNR) is at least about 35 db. For point-ahead links, the SMF-based design is feasible for angles that are smaller fractions of the beamwidth. Switching to a few-mode graded-index (GRIN) fiber instead of an SMF extends the point-ahead range due to more favorable coupling characteristics. A point-ahead offset of up to roughly 1.75× the beamwidth may be feasible depending on the desired pointing bandwidth and the available link margin. Using a double-clad fiber (DCF) with a secondary detector in the receiver chain reduces coupling losses resulting from nutation tracking at higher point-ahead offsets or from distortions of the received wavefront, enabling operation at lower SNR.

Fiber-Coupled, Nutating Transceiver with Integrated Receive and Pointing Chain

Figure 2A:
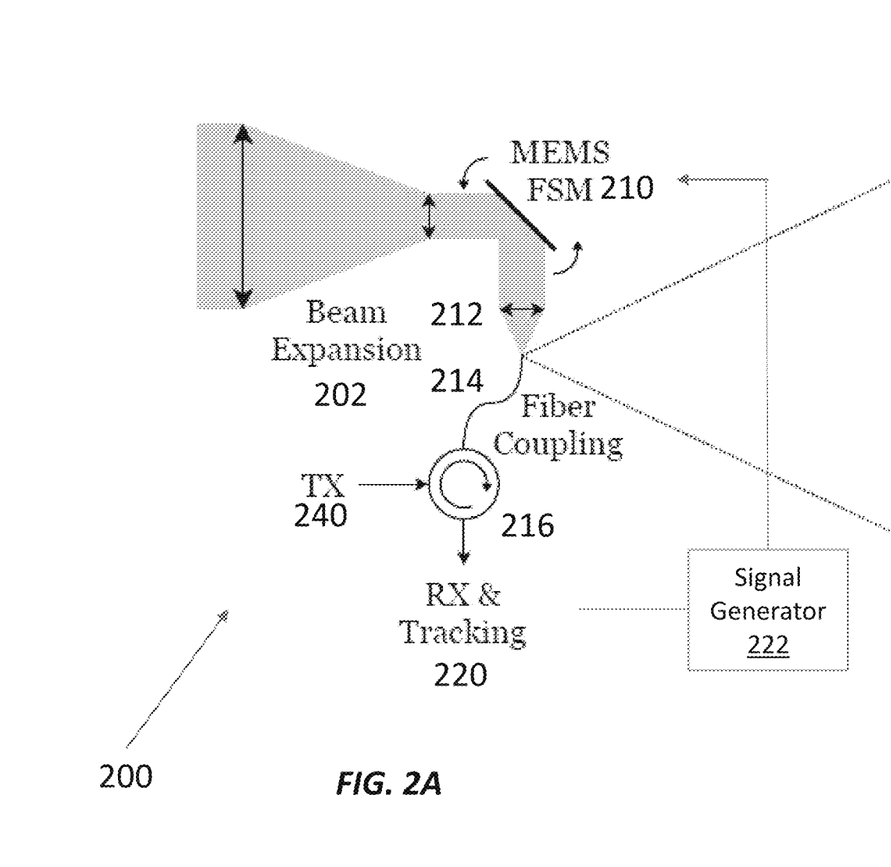
FIG. 2A shows an inventive fiber-coupled transceiver with an integrated receive and tracking chain.

FIG. 2A shows a free-space optical communications transceiver 200 with a fiber transmit (TX) and receive (RX) chain coupled to a common optical front end. This front end includes optional beam expansion/compression optics (telescope) 202, a MEMS FSM 210, and collimation optics 212. The collimation optics 212 couple light into and out of an optical fiber 214, which may be a single-mode fiber (SMF), multi-mode fiber (MMF), graded-index (GRIN) core fiber, or dual-clad fiber (DCF). The optical fiber 214 is coupled to a first port of a fiber-coupled, three-port circulator 216 whose second and third ports are coupled to an integrated RX and tracking chain 220 and TX chain 240, respectively. This transceiver 200 can be used for full-duplex communications. The transceiver 200 can be on a spacecraft (e.g., a LEO satellite), aircraft, ground vehicle, or ground station.

Figure 2B:
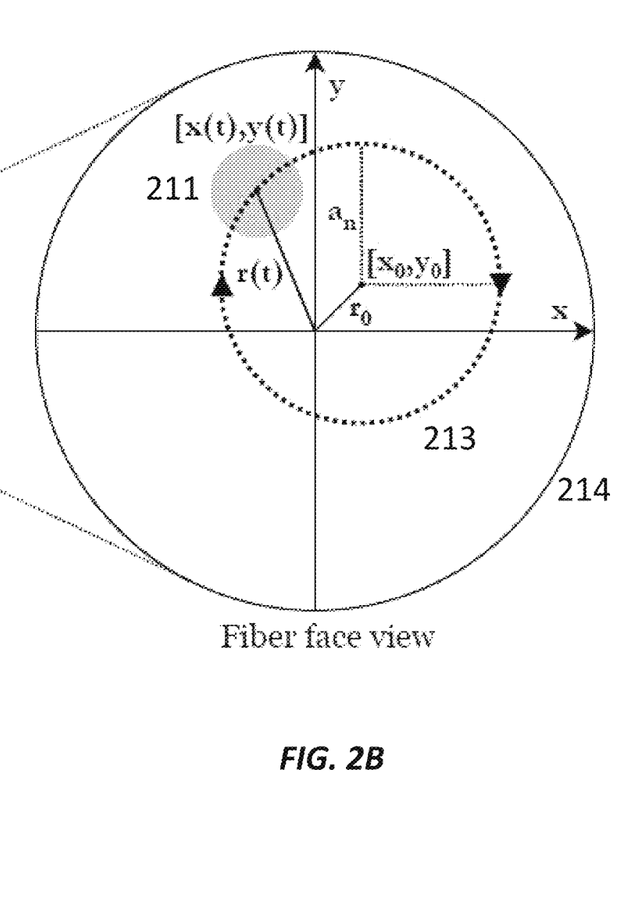
FIG. 2B shows a view of the nutation pattern on the fiber face in the transceiver of FIG. 2A. An a priori unknown steady-state misalignment, $r_0 = \sqrt{x_0^2 + y_0^2}$, is assumed. Superimposing a circular scan with amplitude $a_n$ described by Eqs. (1) and (2) results in a clockwise spot trajectory, $r(t)$, depicted by the dashed circle.

In operation, the transceiver 200 receives an RX signal beam from a remote terminal (not shown) on another spacecraft, aircraft, ground vehicle, or ground station. The telescope 202 receives this RX signal beam and directs it to the FSM 210, which both steers and dithers the RX signal beam with a nutation signal as shown in FIG. 2B and described in greater detail below. The nutation signal amplitude is typically a fraction of the diameter of the focal spot 211 (FIG. 2B) formed by the telescope 202 on the fiber face. It may depend on the system configuration and can be adjusted dynamically based on the received signal power, e.g., with larger excursions for little received power (poor coupling) and smaller excursions for more received power (good coupling).

The collimation optics 212 couple the RX signal beam from free space into the fiber 214, which guides the signal beam to the circulator 216. The circulator 216 guides the RX signal beam to the integrated RX and tracking chain 220, which both detects and demodulates the RX signal beam and derives pointing and tracking corrections from the dither/nutation modulation. The integrated RX and tracking chain 220 drives a signal generator 222 and/or other electronics that generate a control signal that drives the FSM 210. The signal generator 222 can be implemented with a filter and an amplifier that filter and amplify, respectively, the component of the analog photodetector signal at the nutation frequency. A digital-to-analog converter (DAC; not shown) digitizes this analog signal and feeds it to a processor, such as a central processing unit (CPU) or field-programmable gate array (FPGA), which runs the control loop. The processor generates a control signal includes both a fast nutation signal or component (e.g., a sinusoid at a frequency of 1-20 kHz) and a slower component that causes the FSM 210 to point towards the remote terminal and compensates for relative motion of the remote terminal.

The circulator 216 also couples a TX signal beam from the transmit chain 240 into the fiber 214. The collimation optics 212 collimate this TX signal beam and direct it to the FSM 210, which reflects it through the telescope 202 to the remote terminal. The FSM 210 both points the TX signal beam at the remote and dithers it as well in response to the nutation signal modulation. If the remote terminal uses nutation control for pointing and tracking, it should use a different nutation frequency so that the dither imparted on the RX and TX beams by each terminal can be distinguished.

The MEMS FSM 210 acts as the primary beam steering mechanism, as well as a nutation device—the dither is injected on top of the regular control signal in the form of a small circular scan. The nutation angular frequency, $\omega$, is typically faster than the pointing disturbance dynamics, so it can be isolated at the RX detector without distortion. The MEMS FSM 210 can dither at its resonance frequency, as well as in the region beyond its first resonance. Since this region is typically at several kilohertz, it is beyond most environmental disturbance sources.

FIG. 2B depicts the motion of a focal spot 211 formed by the collimation optics 212 on the face of the fiber 214. This focal spot 211 represents the extent and position of the RX signal beam as reflected and dither by the FSM 210 and focused by the collimation optics 212. The FSM 210 nutates the focal spot 211 through a nutation pattern 213 at the nutation angular frequency. The spatial extent or amplitude of the nutation pattern 213 depends on a tradeoff between the tracking accuracy and added pointing loss and can be selected or optimized for each system. Different fibers will have different coupling efficiency slope (as a function of radius). The smaller the slope the further the nutation has to go in general.

In FIG. 2B, the nutation pattern 213 is a circle, but other patterns are also possible, including Lissajous and elliptical patterns. For example, the pattern 213 is selected so that the FSM 210 is driven at different frequencies in the x and y axes for easier phase isolation and detection during calibration. If the focal spot 211 and nutation pattern 213 are misaligned with the fiber core (not shown), which is typically at the center of the fiber 214, the amount of light coupled into the fiber core will vary at the nutation angular frequency. If the focal spot 211 and nutation pattern 213 are aligned with the fiber core—in FIG. 2B, if the circular nutation pattern 213 is concentric with the fiber core—then the amount of light coupled into the fiber core should remain constant.

Figure 2C:
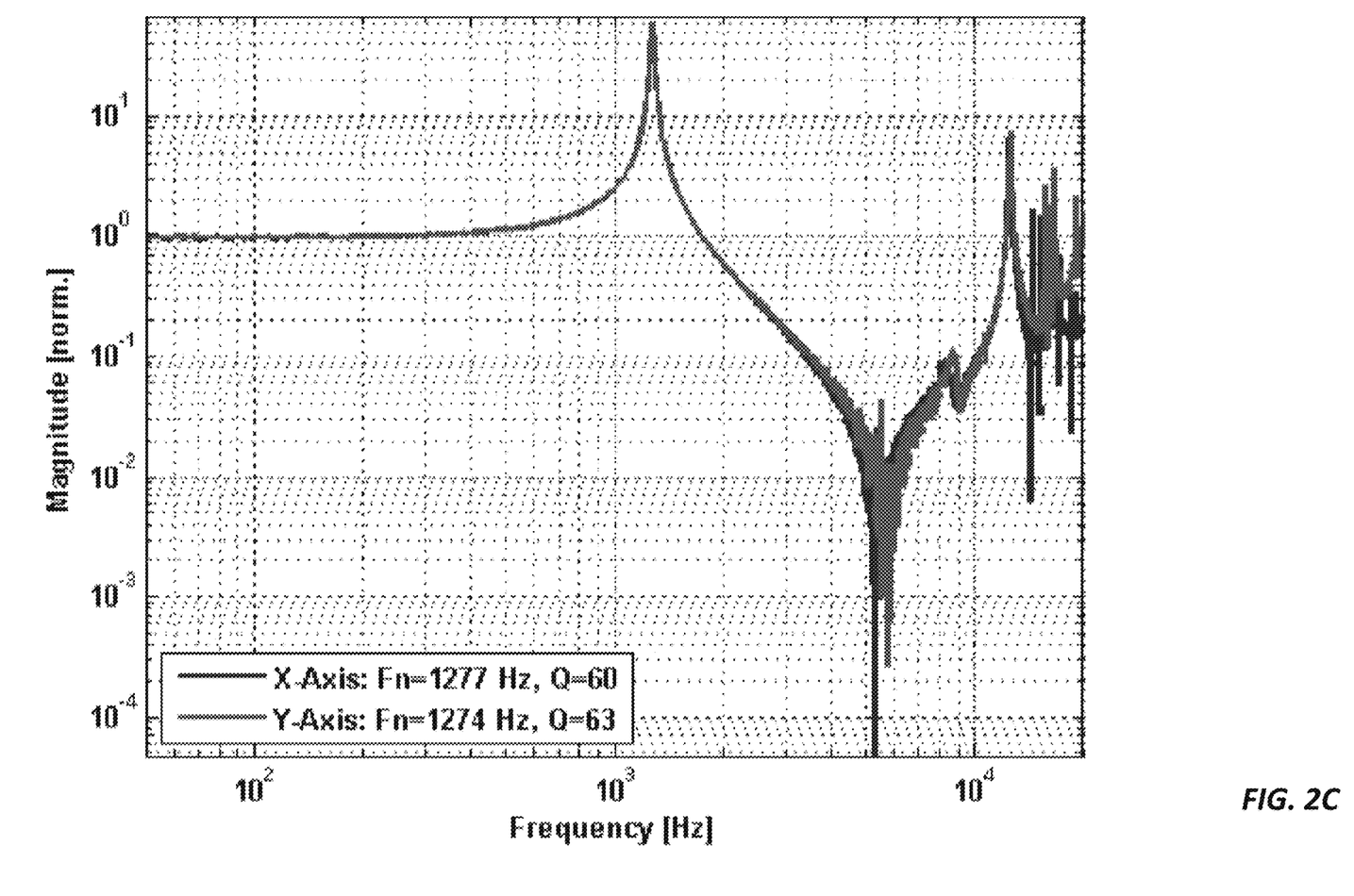
FIG. 2C is a plot of the frequency response of an example MEMS FSM for the fiber-coupled transceiver of FIG. 2A highlighting a possible nutation region.

FIG. 2C shows the frequency response of a MEMS FSM suitable for use in the transceiver 200 of FIG. 2A. This MEMS FSM can be steered independently in the x and y directions and has first resonances at 1277 Hz (x axis) and 1274 Hz (y axis), indicated by large peaks at those frequencies in FIG. 2C. FIG. 2C shows that the frequency response is roughly linear between the first resonances and the second resonances, which are closer to 5 kHz in both axes. Since most pointing disturbances occur at frequencies below 1 kHz, driving the FSM with a nutation/dither signal between the first and second resonance frequencies (here, between about 1.3 kHz and 5 kHz) produces a linear response that is fast enough for accurate pointing and tracking.

Figure 3A:
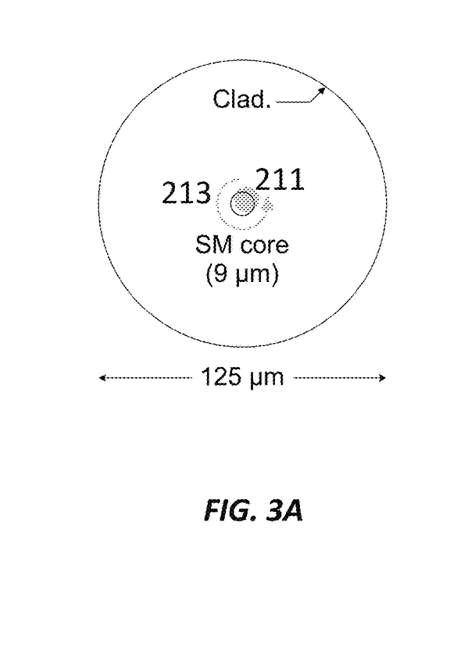
FIG. 3A shows coupling into and nutation about the end face of a single-mode fiber (e.g., SMF-28) in a fiber-coupled transceiver.
Figure 3B:
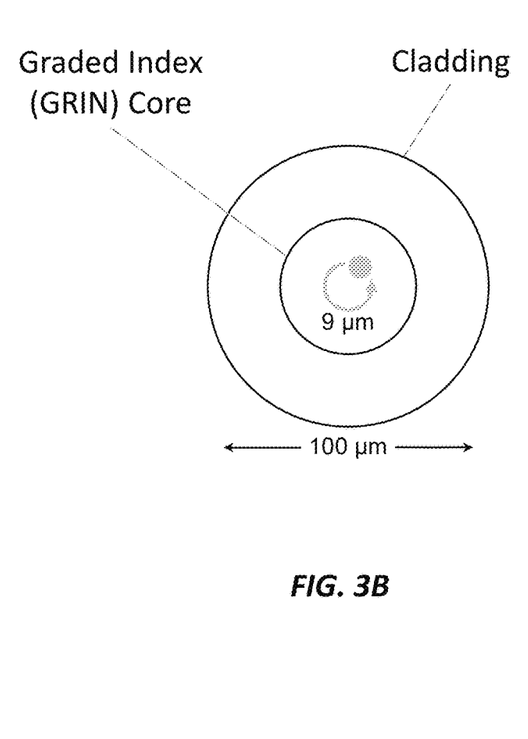
FIG. 3B shows coupling into and nutation about the end face of a few-mode graded index (GRIN) fiber in an inventive transceiver.
Figure 3C:
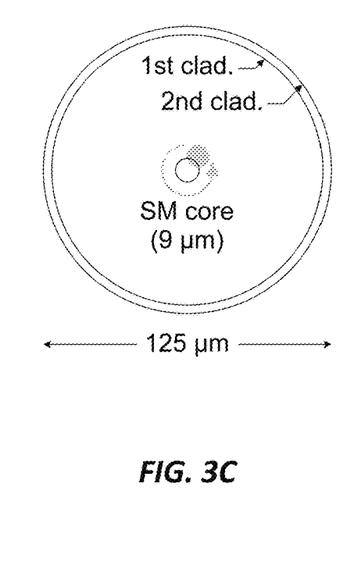
FIG. 3C shows coupling into and nutation about the end face of a dual-clad fiber (DCF) in an inventive transceiver.

FIGS. 3A, 3B, and 3C show the focal spot 211 and circular nutation pattern 213 across the end faces of SMF, GRIN core fiber, and DCF, respectively. For each fiber, the center of the focal spot 211 traces a circular nutation pattern 213 that is concentric with the fiber core when the RX communications beam is aligned properly to the fiber. The radius (amplitude or excursion) of the nutation pattern 213 may vary with fiber type to account for the different variations in coupling efficiency with radius for the different fiber types. In general, the smaller the slope of the coupling efficiency versus radius, the farther the nutation has to go to produce a detectable dither. The MEMS FSM 210 steers or dithers the focal spot 213 in the circular nutation pattern 213 at a frequency that is between the MEMS FSM's first and second resonances—fast enough to compensate environmental perturbations yet slow enough not to interfere with signal demodulation or require high-speed detection.

If the RX communications beam becomes misaligned, then the amount or modal distribution of light coupled into the fiber core varies at the nutation frequency with a relative phase shift proportional to the direction of misalignment. For the SMF in FIG. 3A, light that is not coupled into the core is generally lost in the cladding. In contrast, the GRIN core fiber supports several modes (e.g., 2-5 or 2-10 modes, depending on the point-ahead angle), so all of the light may be coupled into the different fiber modes; the amplitude distribution among the modes varies as the focal spot 213 moves into and out of alignment. And for the DCF, light is coupled into the core and inner cladding in proportion to the alignment and is detected by separate detectors at the other end of the fiber as described below.

Figure 4:
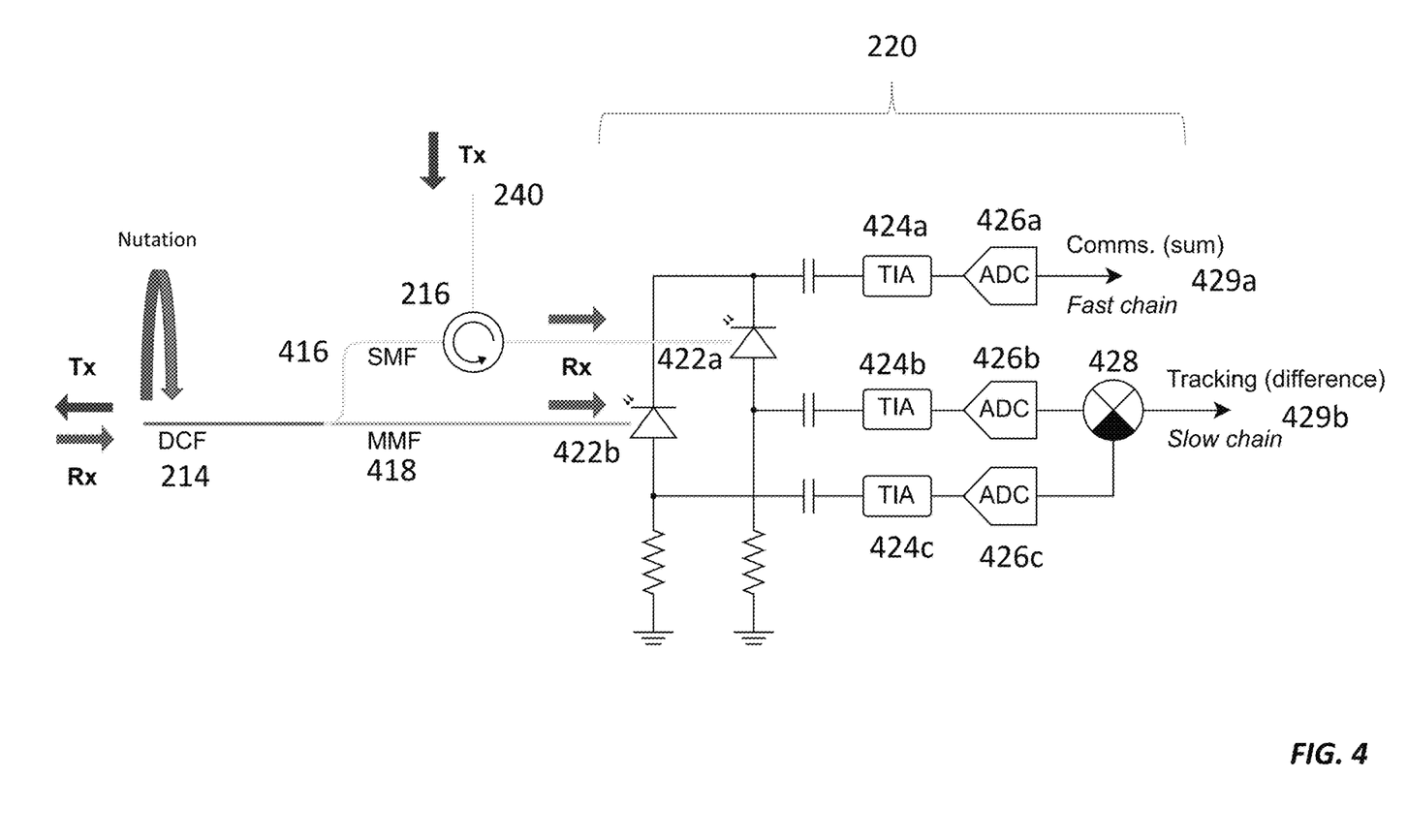
FIG. 4 illustrates a receive (RX) fiber chain utilizing double-clad fiber with a secondary detector in order to decrease $L_{RX}$. A DCF coupler is used to extract power from the DCF inner cladding into a multi-mode fiber (MMF) that is routed to the secondary detector. The rest of the power is routed within the DCF to a primary detector through a circulator with a MMF on the other end.

FIG. 4 shows the integrated pointing and RX chain 220 in greater detail for DCF. The nutating RX communications signal is coupled into the core and inner cladding at one end of the DCF 214. The DCF core is coupled to a SMF 416 that guides a portion of the RX communications signal to the circular 216, which is coupled in turn to a first photodiode 422a, which may have a bandwidth on the order of MHz or GHz. The SMF 416 also couples the TX communications signal from the transmitter 240 to the core of the DCF 214. The inner cladding of the DCF 214 is coupled to a MMF 418 that guides the rest of the RX communications beam to a second photodiode 422b. Each photodiode 422 produces a photocurrent whose amplitude is proportional to the intensity of light detected by that photodiode 422. If used for communications, the second photodiode 422b can be as fast as the first photodiode 422a (e.g., MHz or GHz bandwidth); otherwise, it can be slower for power detection/tracking (e.g., kHz bandwidth).

The cathodes of the first and second photodiodes 422 are coupled to the input of a first transimpedance amplifier (TIA) 424a via a high-pass filter represented by the capacitor in series with the cathodes and TIA 424a. The TIA 424a amplifies the sum of the photocurrents from the photodiodes 422 for digitization by a first analog-to-digital converter (ADC) 426a. The digitized sum is demodulated and processed by a fast electronic communications circuitry 429a for communications.

The anodes of the first and second photodiodes 422 are coupled via respective high-pass filters (capacitors) to the inputs of TIAs 424b and 424c, respectively. The TIAs 424b and 424c are coupled in turn to respective ADCs 426b and 426c, whose outputs are subtracted at a digital subtraction node 428 to produce a digital signal equal to the difference between the photocurrents produced by the photodiodes 422. Slow electronic tracking circuitry 429b processes this digitized difference signal to generate a signal for driving the FSM 210.

In a system with SMF or GRIN fiber instead of DCF, there is no MMF or second photodetector. Instead, there is just the photodetector coupled to the circulator output. This photodetector has a bandwidth selected to detect both the fast modulation for communication (e.g., at MHz or GHz rates) and the slow nutation signal component (e.g., at kHz rates).

The communication and nutation components can be separated from each other in the electrical domain, e.g., using filters or a bias tee, with the nutation component feeding back into the control loop that controls the FSM.

Nutation Loss and Link Budget

For the circular nutation pattern 213 and initial RX beam misalignment, $x_0$ and $y_0$, shown in FIG. 2B, the motion of the focal spot 211 in the fiber face coordinates (with the core at the origin) can be expressed as:

$$x(t) = x_0 + a_n \sin \omega t, \qquad (1)$$

$$y(t) = y_0 + a_n \cos \omega t, \qquad (2)$$

where $a_n$ is the nutation depth or dither amplitude (e.g., up to half the beamwidth) and $\omega$ is the nutation angular frequency, which may be between the first and second resonances of the FSM (e.g., between 1 kHz and 5, 10, 15, or 20 kHz). It is helpful to express the motion in polar coordinates:

$$r_0 = \sqrt{x_0^2 + y_0^2}, \qquad (3)$$

$$\phi_0 = \arctan \frac{y_0}{x_0}, \qquad (4)$$

$$r(t) = \sqrt{x^2(t) + y^2(t)} = \sqrt{r_0^2 + a_n^2 + 2r_0 a_n \sin(\omega t + \phi_0)}. \qquad (5)$$

As fiber nutation is based on extremum-seeking control, it depends on the fact that fiber coupling is maximized when the RX field is most aligned with the fiber mode, which is normally true when r=0. Assuming this is the case, let g(r) be the normalized power coupled into the fiber as a function of the RX spot radial offset. The total power coupled into the fiber can be expressed as $$p(r) = p_{max} g(r), \qquad (6)$$

where $p_{max}$ is the total optical power in the RX spot. The fiber-coupled power as a function of time is then $$p(t) = p_{max} g(r(t)) = p_{max} g(\sqrt{r_0^2 + a_n^2 + 2r_0 a_n \sin(\omega t + \phi_0)}). \qquad (7)$$

In terms of link budget, the dither introduces two new loss terms. First, even when TX/RX is aligned in steady state ($r_0 = 0$), the primary RX detector may suffer a coupling loss proportional to $a_n$, given by $$L_{RX} = \frac{g(r(t)|_{r_0=0})}{g(0)} = g(a_n)/g(0). \qquad (8)$$

Second, the dither may also affect TX beam pointing due to the common optical path. Again assuming $r_0 = 0$ and considering a Gaussian shaped transmit beam, this loss can be expressed as a constant pointing error driven by $a_n$ as $$L_{TX} = \exp(-2a_n^2/w_{TX}^2), \qquad (9)$$

where $w_{TX}$ is the TX beam width inside the fiber (also called the mode field radius), which can also be expressed as the product of the 1/$e^2$ TX divergence angle and the effective focal length of the optical frontend.

The bidirectional link loss due to nutation is therefore $$L_n(a_n) = L_{TX} L_{RX} = [g(a_n)/g(0)] \exp(-2a_n^2/w_{TX}^2). \qquad (10)$$

Signal-to-Noise Ratio (SNR)

For proper operation, the detector SNR should be high enough to achieve a desirable root-mean-square (RMS) spatial position sensing error, $\sigma_r$, given the fiber coupling characteristics, g(r), and some maximum acceptable nutation loss ($L_n$), which is primarily a function of $a_n$. Assume that this SNR is over a certain pointing and tracking bandwidth, BW. Thus, we are looking for a function $$SNR_{BW}(g, \sigma_r, a_n) = ? \qquad (11)$$

This SNR depends in part on point-ahead corrections, which are equivalent to pointing with some fixed TX/RX offset, $r_0 \neq 0$. To account for spatial tracking around this offset, the SNR can be expressed as the more general function $$SNR_{BW}(g, r_0, \sigma_r, a_n) = ? \qquad (12)$$

From Eq. (7), the RX detector (e.g., both photodiodes 422 in FIG. 4) sees a tone at the nutation frequency $$p(t)|_\omega = p_\omega \sin(\omega t + \phi_0), \qquad (13)$$

with some amplitude $p_\omega$. However, since g(r) and r(t) are nonlinear functions, some power may be lost to other harmonics of $\omega$. We can calculate $p_\omega$ using Fourier analysis as $$p_\omega = \frac{\omega}{\pi} \int_{-\phi_0/\omega}^{(2\pi - \phi_0)/\omega} p(t) \sin(\omega t + \phi_0) dt, \qquad (14)$$

which upon expansion becomes $$p_\omega(r_0) = \qquad (15)$$

$$\frac{p_{max} \omega}{\pi} \int_{-\phi_0/\omega}^{(2\pi - \phi_0)/\omega} g\left(\sqrt{r_0^2 + a_n^2 + 2r_0 a_n \sin(\omega t + \phi_0)}\right) \sin(\omega t + \phi_0) dt,$$

and can be simplified using the following variable change $$\tau = \omega t + \phi_0, \qquad (16)$$

to $$p_\omega(r_0) = \frac{p_{max}}{\pi} \int_0^{2\pi} g\left(\sqrt{r_0^2 + a_n^2 + 2r_0 a_n \sin \tau}\right) \sin \tau \, d\tau. \qquad (17)$$

The $p(t)|_\omega$ tone can be measured on the RX chain through a band-pass filter and demodulated to obtain $p_\omega$ and $\phi_0$. Ultimately, $r_0$ can be determined using $p_\omega^{-1}(r_0)$, which allows estimation of the RX spot position $$x_0 = r_0 \cos \phi_0, \qquad (18)$$

$$y_0 = r_0 \sin \phi_0, \qquad (19)$$

which can be used as feedback to control the FSM in its typical pointing regime.

Next, assume that the system operates at some pointing and tracking bandwidth, BW, and that the RX detector has a certain SNR with RMS noise $\sigma_{BW}$ at this bandwidth $$SNR_{BW} = p_{max}^2/\sigma_{BW}^2. \qquad (20)$$

Substituting Eq. (20) into Eq. (17) yields $$p_\omega(r_0) = \frac{\sigma_{BW} \sqrt{SNR_{BW}}}{\pi} \int_0^{2\pi} g\left(\sqrt{r_0^2 + a_n^2 + 2r_0 a_n \sin \tau}\right) \sin \tau \, d\tau. \qquad (21)$$

On the RX detector, the $p_\omega$ measurement may be corrupted with noise $\sigma_{BW}$. This noise produces a spatial position sensing error defined as $\sigma_t$ (in the fiber face coordinates). This is sometimes also called the Noise Equivalent Angle (NEA), and is a good measure of tracking sensor error.

To calculate $\sigma_t$, we use the inverse of $p_\omega(r_0)$ on $\sigma_{BW}$ $$\sigma_t = [r_0/p_\omega(r_0)]\sigma_{BW} = \qquad (22)$$

$$\left(r_0\pi/\sqrt{SNR_{BW}}\right)\left[\int_0^{2\pi} g\left(\sqrt{r_0^2 + a_n^2 + 2r_0 a_n \sin\tau}\right)\sin\tau d\tau\right]^{-1}.$$

Finally, we can solve for $SNR_{BW}$ to get the general equation $$SNR_{BW}(g, r_0, \sigma_t, a_n) = \qquad (23)$$

$$\left[\frac{r_0\pi}{\sigma_t}\right]^2\left[\int_0^{2\pi} g\left(\sqrt{r_0^2 + a_n^2 + 2r_0 a_n \sin\tau}\right)\sin\tau d\tau\right]^{-2}.$$

In scenarios where no point-ahead corrections are needed, the system should mostly track the position around $r_0=0$. In the limit $$\lim_{r_0 \to 0} SNR_{BW}(g, r_0, \sigma_t, a_n), \qquad (24)$$

this simplifies the function to $$SNR_{BW}(g, \sigma_t, a_n) = [\sigma_t g'(a_n)]^{-2}, \qquad (25)$$

where $g'$ is the derivative of the normalized power coupling function $g(r)$.

Single-Mode Transceiver

An inventive transceiver can use SMF for receiving and guiding light (e.g., fiber 214 in FIG. 2A). SMFs are advantageous when coherent detection is employed as well as when rare-earth-doped fiber amplifiers are used to preamplify the optical signals. The following analysis illustrates performance of an inventive transceiver that nutates and couples the RX beam into SMF.

Consider an SMF-28e fiber with both TX/RX wavelengths at 1.55 µm, and with the optical frontend having a clear aperture of about three times the TX beam radius to reduce or minimize beam clipping. This transceiver is modeled in Zemax, with a flat wavefront propagated to the fiber to obtain the RX focal spot distribution. In this case, the distribution is an Airy disk since no external wavefront distortions are assumed. To obtain $g(r)$, overlap integrals between the fundamental mode and the Rx focal spot are calculated at various TX/RX offsets. Since both the fiber mode and the Airy spot are Gaussian-like functions, $g(r)$ can also be approximated well by a Gaussian function, such as $$g(r) = \eta \exp(-\in r^2), \qquad (26)$$

where $\eta$ is the maximum coupling efficiency, and $\in$ is a scaling constant that is fit based on the overlap integrals. For this particular transceiver model, $w_{TX} \approx 5.05$ µm, $\eta \approx 0.7$, and $\in = 0.058$ µm$^{-2}$.

Centered Tracking

As discussed above, if there are no point-ahead corrections, spatial tracking is mostly performed around the center of the fiber, with $r_0 \to 0$. Taking the derivative of Eq. (26), we can evaluate the SNR requirement for centered SMF tracking using Eq. (25), obtaining $$SNR_{BW}(\sigma_t, a_n) = [2\in a_n \sigma_t g(a_n)]^{-2}. \qquad (27)$$

Eq. (27) can be used to evaluate the extra link loss due to nutation, $L_n$, as a function of available SNR given some desired position sensing error $\sigma_t$. This relationship can help set the system operating parameters in terms of reaching an acceptable loss with a realistic SNR, both of which are used for link analysis. As the available SNR increases, the nutation depth $a_n$ can be decreased to maintain a specific $\sigma_t$, which reduces the dither-induced link loss given by Eq. (10).

Figure 5:
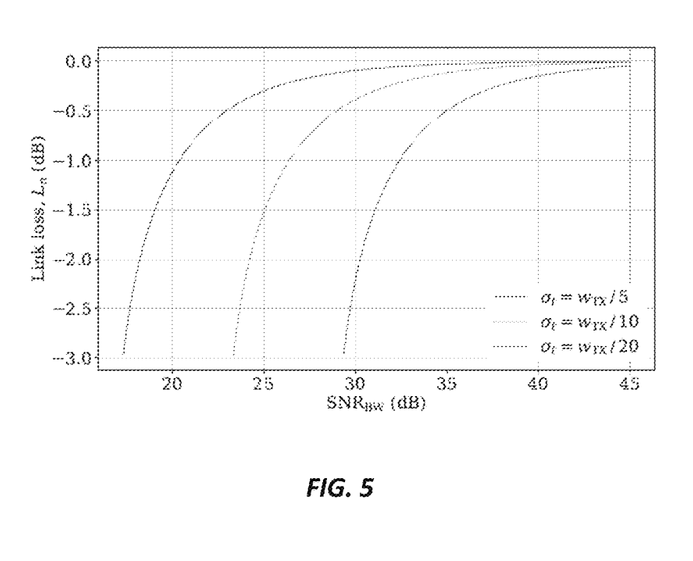
FIG. 5 is a plot showing the extra link loss due to dither as a function of available SNR to achieve position sensing with some RMS error $\sigma_r$, close to the center of an SMF-28e. Here, $\sigma_r$ is given in different fractions of the TX beamwidth $w_{TX}$. As the available SNR increases, the dither amplitude $a_n$ can be decreased to maintain the desired $\sigma_r$. This results in a lower link loss per Eq. (10).

FIG. 5 shows the relationship between link loss and SNR for three different values of $\sigma_t$, given in fractions of the TX beamwidth, $w_{TX}$. The middle case of $\sigma_t = w_{TX}/10$ provides sufficient performance for use as a baseline in some of the following analyses. The actual relationship might, however, vary slightly between different systems, depending on the pointing error budget allocations. The data in FIG. 5 show that for the $w_{TX}/10$ case, $L_n$ starts approaching negligible values (<0.1 db) once $SNR_{BW}$ is roughly above 35 db.

While this is a relatively large SNR requirement, RX detectors normally run at a very high bandwidth, and after filtering the signal to the much slower pointing bandwidth, such SNR is achievable. For instance, if the RX detector runs at 1 GHz and the pointing system runs at 1 kHz, a +30 dB SNR improvement can be theoretically expected as compared to the RX data channel, which indicates such system could be feasible to implement.

Point-Ahead Corrections

We can also evaluate the SMF-based model in terms of its point-ahead correction capability. If point-ahead corrections are desired, a certain TX/RX angular offset should be artificially maintained by the pointing system. In terms of nutation tracking, this means we can no longer apply the $r_0 \to 0$ limit, as the system will be trying to track the position around some offset $r_0 > 0$.

We can calculate the desired SNR for tracking around this offset using Eq. (23). Since a Gaussian $g(r)$ approximation is used, Eq. (23) simplifies to $$SNR_{BW}(r_0, \sigma_t, a_n) = [r_0 \exp(\in[r_0^2 + a_n^2])/2\sigma_t \eta I_1 (2\in r_0 a_n)]^2, \qquad (28)$$

where $I_1$ is the first-order modified Bessel function of the first kind.

The $r_0$ offset may decrease power coupling to the primary RX detector. The additional coupling loss with a point-ahead offset, $L_{RX}(r_0)$, can be approximated as $$L_{RX}(r_0) \approx g(r_0)/g(0) = \exp(-\in r_0^2), \qquad (29)$$

with the total bidirectional link loss then being $$L_n(a_n, r_0) \approx L_{RX}(r_0)(a_n) \approx \exp(-[2(a_n^2/w_{TX}^2) + \in r_0^2]). \qquad (30)$$

Figure 6:
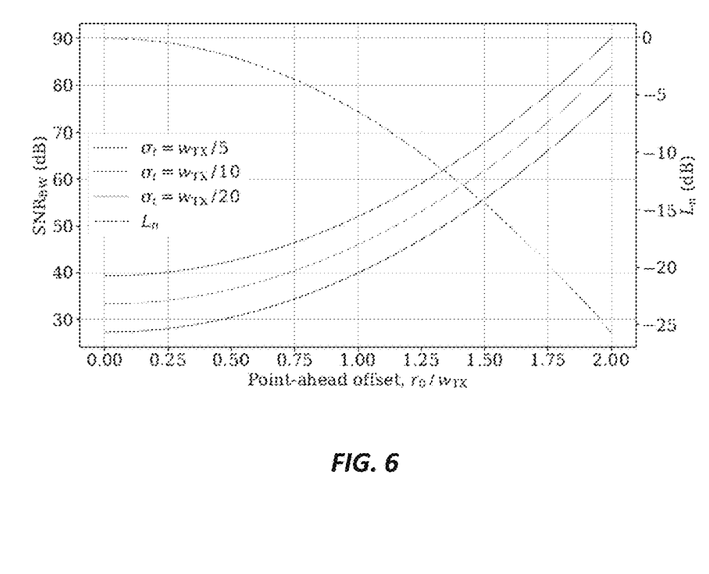
FIG. 6 depicts the $SNR_{BW}$ for spatial tracking at some point-ahead offset $r_0/w_{TX}$ on an SMF-28e-based transceiver. The right-hand axis and the dashed curve additionally show the extra link loss, which is mainly the result of worsened RX power coupling.

FIG. 6 plots both $SNR_{BW}$ and $L_n$ as a function of $r_0$, which is again expressed as a fraction of the TX beamwidth, to illustrate this compound effect of $r_0 \neq 0$. The data in FIG. 6 show that an SMF-based transceiver is possible but may not be ideal for maintaining larger point-ahead offsets due to both the steep increase in SNR and the increased link loss. For instance, maintaining an offset of $w_{TX}$ (i.e., a point-ahead angle of one beamwidth) with $\sigma_t = w_{TX}/10$ involves an $SNR_{BW}$ of 46 dB and results in $L_n$ of -6.5 dB, which can severely degrade the link. However, if the desired point-ahead corrections are smaller fractions of the TX beamwidth, an SMF-based transceiver can perform adequately.

Multimode Receiver

FIG. 6 and Eqs. (28) and (30) indicate that both $SNR_{BW}$ and link loss $L_n$ increase exponentially with $r_0$, which severely limits the feasible point-ahead range, and is a result of the shape of fiber coupling function, g(r). As g(r) is in significant part determined by the available fiber modes, we analyze the point-ahead behavior of an inventive transceiver with (1) a few-mode fiber (e.g., as in FIG. 3B) or (2) a double-clad fiber chain with two detectors (e.g., as in FIGS. 3C and 4). Using a double-clad fiber with one detector coupled to the core and another detector coupled to the cladding can help further reduce $L_{RX}(r_0)$.

Few-Mode GRIN Fiber Coupling

Simulations of the performance of a fiber-coupled transceiver with few-moded GRIN fiber with more favorable normalized fiber power coupling characteristics g(r) shows that increasing the number of fiber modes improves performance. One issue with a Gaussian-like g(r) is that the slope is uneven and decreases rapidly close to the function's tail. This leads to a higher SNR for spatial tracking in this region because the contrast of $p_\omega$, may be reduced.

Figure 7:
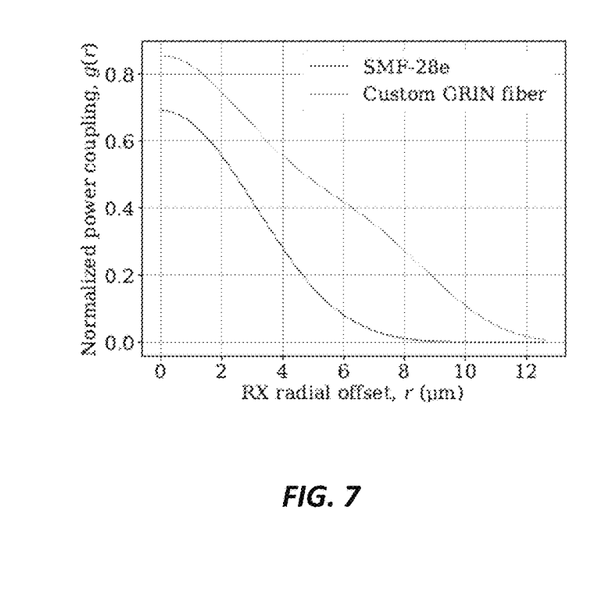
FIG. 7 is a comparison of RX power coupling between SMF-28e and a custom few-mode GRIN fiber. Coupling to the secondary GRIN fiber mode results in a slightly more linear $g(r)$, which can be advantageous for spatial tracking at higher point-ahead offsets.

The simulation presented here is for a few-mode graded index (GRIN) fiber. GRIN fibers have been shown to perform well in terms of propagation of the fundamental mode through bends, which can help maintain a good $M^2$ value of the launched TX beam. Optimizing the GRIN fiber's core radius and refractive index slope yields a GRIN fiber with equivalent $w_{TX}$ (of its fundamental mode) as SMF-28e, but also supporting an additional propagation mode. The extra coupling into this secondary mode leads to a slightly more linear g(r) profile in comparison to SMF-28e, as can be seen in FIG. 7.

Figure 8:
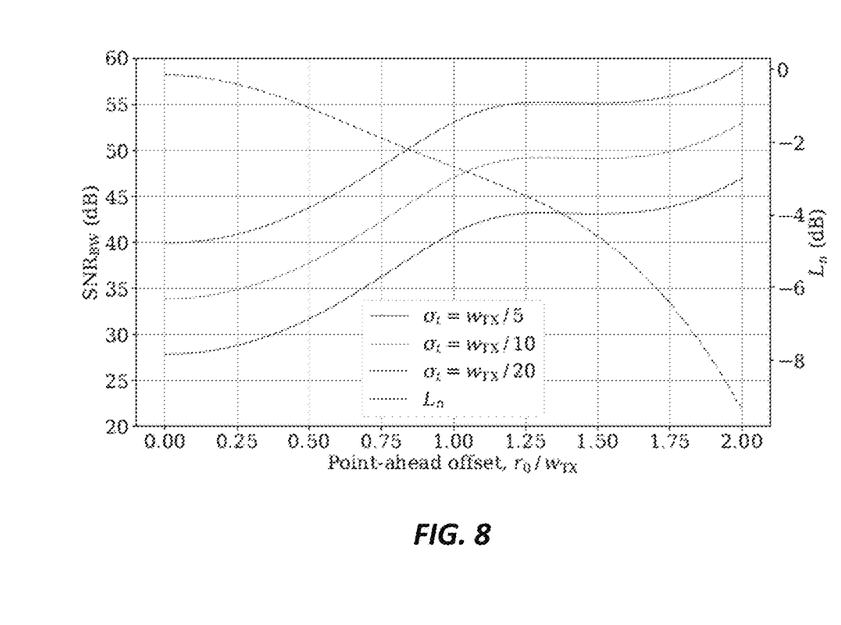
FIG. 8 is a plot of $SNR_{BW}$ for spatial tracking at some point-ahead offset $r_0/w_{TX}$ on a custom GRIN few-mode fiber. The right-hand axis and the dashed curve additionally show the extra link loss, $L_n$, resulting from the injected dither and worsened RX power coupling. A slight improvement over the SMF-28e transceiver can be seen at higher point-ahead offsets.

FIG. 8 shows $SNR_{BW}$ (left axis) and link loss $L_n$ (right axis) versus point-ahead offset for a few-mode GRIN fiber. Since g(r) cannot be easily approximated by a simple function for the few-mode GRIN fiber, the $SNR_{BW}$ can be calculated numerically using Eq. (23). The results in FIG. 8 show that the increase in $L_n$ and $SNR_{BW}$ is not as dramatic as with an SMF-based transceiver. For example, an offset of up to 1.75 $w_{TX}$ can be reached before crossing a 50 dB SNR, with an $L_n$ of about −6 dB for point-ahead offset tracking of $\sigma_t = w_{TX}/10$.

Double-Clad Fiber Coupling

The analyses above indicate that nutation tracking at $r_0 > 0$ is challenging due to increasing link loss $L_n$, which is primarily driven by receiver loss $L_{RX}$. This can also be an issue with $r_0 \to 0$ if the RX wavefront is distorted, for instance, due to atmospheric turbulence, as the non-uniform focal distribution may have less overlap with the fiber modes, reducing the coupling efficiency. This problem could be resolved with a secondary detector configured to receive optical power that is not coupled to the fiber core. For example, using a DCF with a secondary detector coupled to the inner cladding of the DCF as in FIG. 4 can decrease $L_{RX}$ resulting from nutation tracking.

A DCF supports propagation both in its core and in its inner cladding. The core is typically single-mode and the inner cladding is much wider and thus highly multimode. In previous demonstrations, the core has been used to launch a TX beam, while a multimode receiver was used to capture RX power from both the core and the inner cladding. In nutation tracking, the detectors should be able sense how much RX power coupled into the core alone, since position sensing depends on the coupling sensitivity given by g(r), which is the normalized power coupled into the fiber core. This can be done with a photodiode that senses RX light coupled into the core but not the inner cladding, e.g., as in FIG. 4. Consequently, to take advantage of the extra power coupled into the inner cladding, an inventive transceiver with DCF may have a secondary detector (e.g., photodiode 422b in FIG. 4) coupled to the inner cladding. This can be partially achieved using a DCF coupler, which enables extraction of some fraction of power from the inner cladding into a separate fused multimode fiber (MMF). Couplers capable of extracting up to 70% of the inner cladding's power have been demonstrated.

FIG. 4 shows the integrated pointing and RX chain 220 with nutation on a DCF end face in an inventive transceiver. Instead of using a single RX fiber path, the DCF coupler is used to extract most of the power lost to the inner cladding into a MMF 418 routed to a secondary RX detector 422b. The remaining cladding and core power from the DCF 214 are routed to the primary detector 422a. (If the primary photodetector 422a is coupled to MMF instead of SMF, it can be used to sense light from both the core and inner cladding.) While this approach increases the complexity of the RX chain 220, it can be beneficial for systems where RX coupling is degraded and leads to a significant link loss, for instance, due to larger point-ahead offsets or due to wavefront distortion.

Derivation of Centered Tracking Limit

When spatial tracking around the fiber center is performed (i.e., no point-ahead offset is needed), we are interested in the $r_0 \to 0$ limit of Eq. (23)

$$\lim_{r_0 \to 0} SNR_{BW}(g, r_0, \sigma_t, a_n) = \lim_{r_0 \to 0} \left[ \frac{r_0 \pi}{\sigma_t \int_0^{2\pi} g(r(\tau, r_0)) \sin\tau d\tau} \right]^2 = \frac{0}{0},$$

where we can apply L'Hôpital's rule and also simplify by calculating the square root $$\lim_{r_0 \to 0} \sqrt{SNR_{BW}} =$$

$$\lim_{r_0 \to 0} \left[ \frac{r_0 \pi}{\sigma_t \int_0^{2\pi} g(r(\tau, r_0)) \sin\tau d\tau} \right] = \lim_{r_0 \to 0} \frac{a(r_0)}{b(r_0)} = \lim_{r_0 \to 0} \frac{a'(r_0)}{b'(r_0)},$$

where $a'(r_0)$ is simply $$a'(r_0) = \frac{\partial [r_0 \pi]}{\partial r_0} = \pi,$$

and $b'(r_0)$ can be rearranged as $$b'(r_0) = \frac{\partial \left[ \sigma_t \int_0^{2\pi} g(r(\tau, r_0)) \sin\tau d\tau \right]}{\partial r_0} = \sigma_t \int_0^{2\pi} \frac{\partial g(r(\tau, r_0))}{\partial r_0} \sin\tau d\tau,$$

$$\frac{\partial g(r(\tau, r_0))}{\partial r_0} = g'(r(\tau, r_0)) \, r'(\tau, r_0),$$

where:

$$r'(\tau, r_0) = \frac{\partial \left[ \sqrt{r_0^2 + a_n^2 + 2r_0 a_n \sin\tau} \right]}{\partial r_0} = \frac{r_0 + a_n \sin\tau}{\sqrt{r_0^2 + a_n^2 + 2r_0 a_n \sin\tau}},$$

so $$\frac{\partial g(r(\tau, r_0))}{\partial r_0} =$$

$$g'(r(\tau, r_0)) \, r'(\tau, r_0) = g'\left(\sqrt{r_0^2 + a_n^2 + 2r_0 a_n \sin\tau}\right) \frac{r_0 + a_n \sin\tau}{\sqrt{r_0^2 + a_n^2 + 2r_0 a_n \sin\tau}},$$

-continued $$\left.\frac{\partial g(r(\tau, r_0))}{\partial r_0}\right|_{r_0=0} = g'(a_n)\sin\tau,$$

and $$b'|_{r_0=0} = \sigma_t g'(a_n) \int_0^{2\pi} \sin^2(\tau)d\tau = \sigma_t g'(a_n)\pi.$$

Finally, $$\lim_{r_0 \to 0} \sqrt{SNR_{BW}} = \lim_{r_0 \to 0} \frac{a'(r_0)}{b'(r_0)} = \frac{1}{\sigma_t g'(a_n)}.$$

Thus, $$\boxed{SNR_{BW}(g, \sigma_t, a_n) = [\sigma_t g'(a_n)]^{-2}}.$$

CONCLUSION

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize or be able to ascertain, using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

Also, various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The invention claimed is:

1. A free-space optical communications system comprising:
    a telescope to receive a free-space optical communications signal from a remote terminal;

a dual-clad optical fiber, in optical communication with the telescope, to receive the free-space optical communications signal from the telescope;

a fast-steering mirror, in optical communication with the telescope and the dual-clad optical fiber, to steer the free-space optical communications signal in a nutation pattern across an end face of the dual-clad optical fiber, thereby coupling a first portion of the free-space optical communications signal into a core of the dual-clad optical fiber and a second portion of the free-space optical communications signal into an inner cladding of the dual-clad optical fiber; and a signal generator, operably coupled to the fast-steering mirror, to drive the fast-steering mirror at a nutation frequency greater than a first resonance frequency of the fast-steering mirror.

2. The free-space optical communications system of claim 1, wherein the nutation frequency is less than a second resonance frequency of the fast-steering mirror.

3. The free-space optical communications system of claim 2, wherein the nutation frequency is between 1 kHz and 20 kHz.

4. A free-space optical communications system comprising:

a telescope to receive a free-space optical communications signal from a remote terminal;

a dual-clad optical fiber, in optical communication with the telescope, to receive the free-space optical communications signal from the telescope;

a fast-steering mirror, in optical communication with the telescope and the dual-clad optical fiber, to steer the free-space optical communications signal in a nutation pattern across an end face of the dual-clad optical fiber, thereby coupling a first portion of the free-space optical communications signal into a core of the dual-clad optical fiber and a second portion of the free-space optical communications signal into an inner cladding of the dual-clad optical fiber; and a coupler, in optical communication with an output of the dual-clad optical fiber, to couple the first portion of the free-space optical communications signal from the core of the dual-clad optical fiber to a first detector and to couple the second portion of the free-space optical communications signal from the inner cladding of the dual-clad optical fiber to a second detector.

5. The free-space optical communications system of claim 4, further comprising:

circuitry, operably coupled to the first detector and the second detector, to produce a signal proportional to a sum of the first portion and the second portion and a signal proportional to a difference between the first portion and the second portion.

6. A free-space optical communications system comprising:

a telescope to receive a first free-space optical communications signal from a remote terminal;

a dual-clad optical fiber, in optical communication with the telescope, to receive the first free-space optical communications signal from the telescope;

a fast-steering mirror, in optical communication with the telescope and the dual-clad optical fiber, to steer the first free-space optical communications signal in a nutation pattern across an end face of the dual-clad optical fiber, thereby coupling a first portion of the first free-space optical communications signal into a core of the dual-clad optical fiber and a second portion of the first free-space optical communications signal into an inner cladding of the dual-clad optical fiber; and a transmitter, in optical communication with the dual-clad optical fiber, to transmit a second free-space optical communications signal to the remote terminal via the core of the dual-clad optical fiber, the fast-steering mirror, and the telescope.

7. The free-space optical communications system of claim 6, wherein the fast-steering mirror is further configured to point the second free-space optical communications signal toward the remote terminal.

8. A free-space optical communications system comprising:

a telescope to receive a free-space optical communications signal from a remote terminal;

an optical fiber, in optical communication with the telescope, to receive the free-space optical communications signal;

a fast-steering mirror, in optical communication with the telescope and a first end of the optical fiber, to steer the free-space optical communications signal in a nutation pattern across an end face of the optical fiber at a nutation frequency between 1 kHz and 20 kHz; and a photodetector, in optical communication with a second end of the optical fiber, to detect light modulated at the nutation frequency.

9. The free-space optical communications system of claim 8, wherein the optical fiber has a graded-index (GRIN) core that supports a plurality of optical modes.

10. The free-space optical communications system of claim 8, wherein the optical fiber is a dual-clad optical fiber having a core surrounded by an inner cladding and the at least one photodetector comprises:

a first photodetector, in optical communication with the core, to detect a first portion of the free-space optical communications signal; and a second photodetector, in optical communication with the inner cladding, to detect a second portion of the free-space optical communications signal.

11. The free-space optical communications system of claim 10, further comprising:

circuitry, operably coupled to the first photodetector and the second photodetector, to produce a signal proportional a sum of the first portion and the second portion and a signal proportional to a difference between the first portion and the second portion.

12. The free-space optical communications system of claim 8, wherein the free-space optical communications signal is a first free-space optical communications signal, and further comprising:

a transmitter, in optical communication with the optical fiber, to transmit a second free-space optical communications signal to the remote terminal via the optical fiber, the fast-steering mirror, and the telescope.

13. The free-space optical communications system of claim 12, wherein the fast-steering mirror is further configured to point the second free-space optical communications signal toward the remote terminal.

14. A method of free-space optical communications, the method comprising:

receiving a free-space optical communications signal from a remote terminal;

nutating, with a fast-steering mirror, the free-space optical communications signal across an end face of a first end of an optical fiber at a nutation frequency greater than a first resonance frequency of the fast-steering mirror and less than a second resonance frequency of the fast-steering mirror; and detecting light modulated at the nutation frequency at a second end of the optical fiber.

15. The method of claim 14, wherein the optical fiber has a graded-index (GRIN) core that supports a plurality of optical modes.

16. The method of claim 14, wherein the optical fiber is a dual-clad optical fiber having a core surrounded by an inner cladding and detecting light modulated at the nutation frequency comprises:

detecting a first portion of the free-space optical communications signal coupled into and guided by the core of the dual-clad optical fiber; and detecting a second portion of the free-space optical communications signal coupled into and guided by the inner cladding of the dual-clad optical fiber.

17. The method of claim 16, further comprising:

producing a first signal proportional a sum of the first portion and the second portion and a second signal proportional to a difference between the first portion and the second portion.

18. The method of claim 14, wherein the free-space optical communications signal is a first free-space optical communications signal, and further comprising:

transmit a second free-space optical communications signal to the remote terminal via the optical fiber and the fast-steering mirror.

19. The method of claim 14, further comprising:

adjusting a nutation pattern of the free-space optical communications signal across the end face of the first end of the optical fiber in response to detecting light modulated at the nutation frequency at a second end of the optical fiber.

* * * * *